(12) United States Patent
Lecomte et al.

(10) Patent No.: US 7,702,103 B2
(45) Date of Patent: Apr. 20, 2010

(54) DEVICE FOR THE TRANSFORMATION OF MPEG 2-TYPE MULTIMEDIA AND AUDIOVISUAL CONTENTS INTO SECURED CONTENTS OF THE SAME TYPE

(75) Inventors: Daniel Lecomte, Paris (FR); Sébastien Georges, Paris (FR)

(73) Assignee: Nagra France (FR)

( * ) Notice: Subject to any disclaimer, the term of this patent is extended or adjusted under 35 U.S.C. 154(b) by 1412 days.

(21) Appl. No.: 11/101,793

(22) Filed: Apr. 8, 2005

(65) Prior Publication Data

US 2005/0213760 A1     Sep. 29, 2005

Related U.S. Application Data

(63) Continuation of application No. PCT/FR2003/050106, filed on Oct. 24, 2003.

(30) Foreign Application Priority Data

Oct. 25, 2002    (FR) .................................. 02 13397

(51) Int. Cl.
 *H04N 7/00* (2006.01)
(52) U.S. Cl. .......................... 380/217; 380/210; 380/42
(58) Field of Classification Search .................. 380/217, 380/42, 210, 242
See application file for complete search history.

(56) References Cited

U.S. PATENT DOCUMENTS

2002/0018565 A1    2/2002    Luttrell et al.

2003/0159139 A1*    8/2003    Candelore et al. ............. 725/25

FOREIGN PATENT DOCUMENTS

| EP | 1 033 880 A2 | 9/2000 |
| EP | 1 365 589 A1 | 11/2003 |
| WO | WO 01/97520 A2 | 12/2001 |

\* cited by examiner

*Primary Examiner*—Kimyen Vu
*Assistant Examiner*—Edward Zee
(74) *Attorney, Agent, or Firm*—DLA Piper LLP (US)

(57) ABSTRACT

A process for distributing video sequences according to a nominal flux format including a succession of images, where each image includes a succession of blocks, and in which at least one of blocks in one of the images is calculated by motion prediction relative to at least one reference image, where the motion prediction is encoded in the flux with at least one motion vector, the flux being processed, before transmission to client equipment, with an analysis for generating a first modified flux having the format of a nominal flux and having images modified by substitution of selected data with selected data of the same nature, but random, and a second flux of any format including the substituted data and digital information likely to allow reconstruction of the modified flux, then transmitting separately, in real or deferred time, the two fluxes generated from a server toward the client equipment, and for which is calculated on the client equipment a synthesis of a nominal format flux as a function of the primary flux and of the second flux distinguished by the fact that the modification includes modifying at least one of the motion vectors.

15 Claims, 3 Drawing Sheets

DEVICE FOR THE TRANSFORMATION OF MPEG 2-TYPE MULTIMEDIA AND AUDIOVISUAL CONTENTS INTO SECURED CONTENTS OF THE SAME TYPE

RELATED APPLICATION

This is a continuation of International Application No. PCT/FR2003/050106, with an international filing date of Oct. 24, 2003 (WO 2004/040895, published May 13, 2004), which is based on French Patent Application No. 02/13397, filed Oct. 25, 2002.

FIELD OF THE INVENTION

This invention involves the scrambling of multimedia programs or sequences that use a nominal flux format of the MPEG-2 type in such a way that it creates conditional access, secured broadcast, monitoring of recording, private copying and viewing of these multimedia programs or sequences by authorized users.

BACKGROUND

The general problem is to provide a device that is capable of transmitting, in a secure fashion, a set of high-quality visual films in an MPEG-2 type format directly to a viewing screen such as, for example, a television screen or to be recorded on the hard disk of a box that connects the teletransmission network to a monitor-type screen, television screen, video projector or cinema screen all while preserving audiovisual quality, but avoiding fraudulent utilization such as the possibility of making pirated copies of films or audiovisual programs recorded on the hard disk of the decoder box.

With presently available solutions, it is possible to transmit films and audiovisual programs in digital format through broadcast networks of the Hertzian, cable, satellite, etc. type, or through DSL (Digital Subscriber Line) or BLR (local radio loop) telecommunications-type networks, through DAB (Digital Audio Broadcasting) networks, through RTC (Switched Telephone Network) networks or even through digital telecommunications networks (GSM, GPRS, UMTS, etc.). These works are often encrypted through various means well known in the art to avoid pirating of works broadcast in this way.

Nevertheless, the primary drawback for all currently available solutions (TiVo Inc., WO00165762) is that it is necessary to transmit not only the encrypted data, but also the decryption keys, towards the users. Transmission of decryption keys can take place before, at the same time or after the transmission of audiovisual programs. To increase security and therefore the protection of audiovisual works against ill-disposed use, decryption keys as well as audiovisual decoder decryption functions can comprise an improved means of security like continuous changes of encrypting keys all along the same audiovisual program, or chip cards or other physical keys which can, as an option, be updated remotely.

In this way, the solutions currently applied to a decoder box with the possibility of local recording of audiovisual programs in digital format on a support of the hard disk type or other type of memory, offers to the ill-disposed user the possibility of making unauthorized copies of programs recorded in this way, because at a given time, this user has, with a digital decoder box, whether or not it is associated with chip card systems, all the information, software programs and data to allow complete decryption of the audiovisual programs. In fact, because the availability of the data, the ill-disposed user will have the possibility of making illegal copies without anyone being aware of this fraudulent copying at the time it takes place.

One solution therefore consists of transmitting all or part of a digital audiovisual program solely upon request (on-request video services) through a broadband telecommunication network of the ADSL, cable or satellite type, without authorizing the local recording of audiovisual programs. WO 00/11871 (Open Entertainment) discloses a solution for distributing multimedia files upon request of the user. The drawback there is completely different and originates from the performances of these networks which do not allow guarantee of continuous flux of several megabits per second to each user, as required by the MPEG-2 flux which necessitates bandwidths of from several tens of kilobits to several megabits per second.

Another solution consists of separating the flux into two parts of which neither would be usable by itself. WO 99/08428 (Gilles Maton) discloses a multi-application treatment process of an active localizable terminal in which at least one connection is made with an identifiable program that is dedicated to the execution of an application, where the program dictates its conditions for making the functions available for use to the terminal. Through the use of a connection, the terminal punctually dialogs with the management center for the creation, if necessary, of input and output of capacities of this latter, where the management center may or may not become enslaved with the terminal at the level of the application with regard to the input program. That investigation likewise involves the identification process for the program and terminal being used. That process divides the flux into one part that is used to identify the user and one part that contains the program itself. In particular, the program is not usable, but is only interlocked by the first part.

U.S. 2002/0018565 discloses a method and system of controlling access to a normalized multimedia flux. That disclosure rests on the use of selective encrypting methods which keep the binary flux in compliance with its original standard. The authorized user must use a decryption key to have access to the video flux. Protection is carried out in three stages: extraction of encoded words, encryption of coded words and re-insertion of encrypted coded words into the binary flux. One example that is specific to the motion vectors is cited with the MPEG-4 type flux. Even so, the protection of flux motion vectors is supported by encryption methods that are well known. The initial contents of the flux are found entirely in the protected flux. Given that the solution from that disclosure preserves all the original data within the protected flux, it does not meet the high-security criteria.

On the other hand, EP 0778513 (Matsushita) describes a process that allows the illegal use of information to be prevented by adding monitoring information to verify the user's rights. The system allows the user to permanently know what part of the information is being used and by which user and from there to know if the user is in an illegal position or not. That process therefore secures the data by adding additional information to it that denatures the initial information.

WO 00/49483 (Netquartz) likewise discloses processes and systems to create a connection between the users and an editor of digitized entities. The process consists of at least one of the following stages: the stage for subdividing the digitized entity into two parts; the stage for memorizing one part in a memory zone of a server connected to a computer network; the stage where the other part is transmitted to at least one user who has computer equipment access; the connecting stage for the computer equipment to the computer network; the stage for establishing a functional connection between the first part and the second part. Those processes and systems do not specify whether the part recorded on the server can be stored by the user, which would allow this user to pirate the digitized entity.

WO 01/97520 "Video interface device, distribution system and transfer method for encoded programs and video sequences through the communication network" discloses a device for the secure broadcast of protected video fluxes. Protection of the video flux is carried out by replacing certain original imaged I by "false" images I or by permuting certain images I between them. The original images I extracted from the video flux are stored separately from the protected flux and are sent to the user when he wishes to view the video. In this way, replacing the original images I with "false" images I modifies the size of the protected flux relative to the original flux. Moreover, an ill-disposed user can easily detect a false I image of index n, because this image of index n is very different from the I image of index n−1 and from the I image of index n+1; then easily replace it with the I image of index n−1 or index n+1, or by an image calculated by interpolation between the images I of index n−1 and n+1, and thus recreate a flux very close to the original. Moreover, in an MPEG-2 flux, the images I represent only about one image out of 12 or 15, do not modify the remaining 11 P and B images, and do not sufficiently degrade the video, in particular because these P and B images also contain the intra macroblocks which "reconstruct" the image. Likewise, substituting the entire assembly with an I image is a rather extensive modification, one which is easily revealed by an automaton responsible for reconstructing the video. That solution does not therefore meet the high-security and strong visual degradation criteria for video fluxes.

Finally, U.S. Pat. No. 5,937,164 discloses a solution that consists of separating the flux into two parts of which the smaller part holds information necessary for utilization of the larger part. Nevertheless, that disclosure is not sufficient to address the identified problem. In effect, suppression of one part of the flux denatures the flux format, and is not therefore recognized as a standard flux, usable with general software applications. That process requires, at the same time, a specific server-side software, for separation of the two parts, and another specific software which ensures not only reconstruction of the flux, but also acquisition of the primary flux and its exploitation according to a format that is proprietary to the solution. That proprietary format is not the initial format of the flux before it was separation into two parts, in this known solution. In this way, an ill-disposed user will very easily detect the denatured data, specifically because of the non-compliance of the flux after separation.

U.S. Pat. No. 5,892,825 revisits the preceding patent, but in a narrower scope because the fluxes are still encrypted in it. U.S. Pat. No. 6,035,329 relies on the same principal and concerns a process that allows reading of a disk of the CD-ROM or DVD-ROM type, conditionally upon identification of rights by the insertion of a chip card on which information necessary for reading are stored. That process is not sufficient because it does not guarantee that the modified flux will be of the same format as the original flux. Finally, U.S. Pat. No. 6,185,306 discloses a process of transmitting encrypted data from a Web site to a requesting computer. That process nevertheless allows the user to access at any given time the tools necessary for copying the data.

SUMMARY OF THE INVENTION

This invention relates to a process for distributing video sequences according to a nominal flux format including a succession of images, where each image includes a succession of blocks, and in which at least one of the blocks in one of the images is calculated by motion prediction relative to at least one reference image, where the motion prediction is encoded in the flux with at least one motion vector, the flux being processed, before transmission to client equipment, with an analysis for generating a first modified flux having the format of a nominal flux and having images modified by substitution of selected data with selected data of the same nature, but random, and a second flux of any format including the substituted data and digital information likely to allow reconstruction of the modified flux, then transmitting separately, in real or deferred time, the two fluxes generated from a server toward the client equipment, and for which is calculated on the client equipment a synthesis of a nominal format flux as a function of the primary flux and of the second flux distinguished by the fact that the modification includes modifying at least one of the motion vectors.

This invention also relates to equipment for manufacturing a video flux according to the process for distributing video sequences, including at least one multimedia server containing original video sequences and a device for analyzing the video flux originating from the server to generate the first flux and the second flux.

This invention further relates to a system for transmitting a video flux according to the process for distributing video sequences, including a piece of video flux production equipment, at least one piece of video flux user equipment and at least one communication network between the piece of production equipment and the piece(s) of user equipment.

BRIEF DESCRIPTION OF THE DRAWINGS

The invention will be better understood upon reading the description of a non-limiting example of a selected aspect which follows, in reference to the attached drawings where.

DETAILED DESCRIPTION

This invention involves a process for distributing video sequences according to a nominal flux format comprising data representing a succession of images of which some are encoded by prediction, using other flux images as is the case with the MPEG-2 standard.

An MPEG-2 type video flux is broken down into the form of a succession of images of different types of which some contain motion vectors. The three types of images which are present in a flux of the MPEG-2 type are: I images (for Intra), which are transmitted in their entirety (the value of each pixel of the image is transmitted); P images (predicted), of which at least one part is calculated using the preceding I or P images; B (bidirectional) images of which at least one part is calculated using preceding and subsequent I and/or P images. B and P images are predicted from the points of view of motion and pixel value. I images therefore do not contain information on motion.

The macroblock is the base unit for calculating motion compensation. The macroblocks for each image are successively encoded, from left to right and from top to bottom. Each macroblock consists of several 8×8 blocks (6 in the case of 4:2:0): four luminance blocks, one or more chrominance blocks Cb and one or more chrominance blocks Cr. It should be noted that the luminance blocks cover the same zone of the image as the chrominance blocks in each of the components, due to the sub-sampling of chrominance data, which is carried out to adapt the encoding of the sensitivity of the human visual system. The macroblock header contains the type of encoding that is necessary during decoding and analysis of the decoder motion vectors. Each prediction case (field or frame) allows the decoder to use the differential motion vectors in a different manner to reconstruct the image.

The predicted P images are therefore encoded with two different types of information:
- a prediction of motion which determines, for each macroblock of the image calculated, the zone of the reference image from which it is predicted; this motion prediction is expressed in the form of a vector;
- a prediction error that specifies, for each macroblock of the image calculated, the differences between the predicted values obtained by motion compensation and the actual pixel values of the encoded macroblock.

In the case of a B image, a macroblock is predicted using two different predictions, where the first is based on a prior image, the second on a future image, where these two predictions are then averaged to form the prediction used for the compensation of motion. In this type of image, two vectors are therefore transmitted so as to be able to form a prediction.

In some cases, macroblocks of a predicted image are transmitted in full (as in an Intra image). These macroblocks are called "Intra" macroblocks.

In a general form, the invention involves a process for distributing video sequences according to a nominal flux format comprising a succession of images, where each image comprises a succession of blocks, and in which at least one of the blocks in at least one of the images is calculated by prediction of motion relative to an image called a reference image, where the motion prediction is encoded in the flux with at least one motion vector, the flux on which we proceed, before transmission to the client equipment, to a flux analysis to generate a first modified flux, has the format of a nominal flux, and has images that are modified by the substitution of certain data with data of the same nature, but which are random, and a second flux of any format, comprising the substituted data and the digital information that is designed to allow reconstruction of the modified flux, then to transmit separately, in real time or in different time, the two generated fluxes from the server to the receiving equipment, and for which is calculated, on the receiving equipment, a synthesis of a nominal format flux as a function of the first flux and of the second flux and where the modification consists of modifying at least one of the motion vectors.

According to one aspect of the invention, the nominal flux format is defined by the MPEG-2 standard. Advantageously, the motion vectors are modified by substitution of certain motion vector values with values of the same nature, but which are random, and the second flux comprises the substituted motion vector values and the digital information that will permit reconstruction of the modified images. Preferably, the analysis decides the motion vector values to be changed as a function of the desired size for the second flux and the degradation desired for the first modified flux.

According to another aspect of the invention, transmission of the first flux is conducted through a broadband network [cable, satellite, Hertzian digital, optical fiber, DSL (Digital Subscriber Line), BLR (local radio loop)] or DAB [Digital Audio Broadcasting]. In one particular aspect, transmission of the second flux is conducted through a switched telephone network (analog or digital RTC), or through a DSL (Digital Subscriber Line) type network, or through a BLR (local radio loop) network or through a mobile telephone network that uses GSM, GPRS or UMTS standards. In another aspect, transmission of the second flux takes place through a physically distributed equipment support (flash memory card, chip card).

The invention also involves equipment for manufacturing a video flux for the purpose of implementing the process according to one of the preceding characteristics, comprising at least one multimedia server containing the original video sequences and comprising a device for analyzing video flux originating from the server to generate the two fluxes.

Finally the invention has, on a system for transmission of a video flux, for the implementation of the process which comprises production equipment for video flux, at least one piece of video flux user equipment and at least one communication network between the production equipment and the piece(s) of user equipment.

The invention involves a broadcast process for secured audiovisual contents that uses motion prediction information. As a function of the Video flux format (interlaced or progressive), the different images are decoded using frames or fields. One frame contains lines of spatial information for a video signal. In the case of an interlaced video, the frame consists of 2 fields, an upper, "top-field" and a lower "bottom-field". A field contains a set of alternating lines. The "frame-based" prediction is a manner of predicting that uses the 2 fields in the reference frame. The "field-based" prediction is a manner of prediction that uses only one field in the frame of reference. Still in the interlacing case, the MPEG-2 standard authorizes the frame to be encoded as an image, or else the two fields to be encoded as two images. This type of encoding is variable from one frame to another, where field encoding is preferred when the visual sequence has a lot of motion. In this case, the first field is used to predict the second.

The motion compensation process forms predictions using previously decoded images (in the decoding process chronology) which, once combined with the decoded DCT coefficient, allows the image to be reconstructed.

The MPEG-2 type Video flux contains, for each predicted macroblock, the encoded information that determines the reference image zone that is visually closest to the current macroblock. This encoded information is represented in the form of a vector (motion vectors). A macroblock can refer to multiple different images or fields. There can therefore be multiple motion vectors for one macroblock.

As a function of the image type (P or B) and of the type of prediction used (field or frame), a certain number of separated predictions (originating from different motion vectors) are formed for each macroblock (in case of B images where we have vectors that refer to previous information (in the flux restitution order)—vectors called "forward" vectors and— following them—vectors called "backward" vectors, and these latter are combined during decoding in order, in the end, to get one single prediction.

In the case of Intra macroblocks, no prediction is formed. Nevertheless these blocks can also transport motion vectors ("concealment motion vectors") that are used for correcting coefficients that are lost during transmission, but this particular case does not involve the invention.

The macroblocks for B or P images comprise motion vectors which are made to be transformed by the invention. Each motion vector is broken down in to a horizontal component and a vertical component, each of which potentially has a residual value. Each component is differentially encoded relative to the previously decoded motion vectors, which signifies that during decoding of a macroblock prediction vector, the encoded component in the macroblock being considered is added to the last completely decoded value. Each component is encoded in the same way: by a primary field (motion_code in MPEG-2) encoded by a VLC ("Variable Length Code": encoding by variable length technique; this is an encoding technique that allocates a value of a small number of bits to a frequent event, whereas an unusual value will be represented by a longer code) and a residual field (motion_residual in MPEG-2) that is encoded on a number of bits that depends on other fields present in the flux. The invention involves modification of the primary component and/or the residual component.

The change in the value of the motion vector components greatly modifies the perception of the MPEG-2 flux displayed on a standard viewing device. It is moreover possible to modify the values of the motion vector components without modifying the format of the MPEG-2 flux. One of the methods of the invention comprises replacing the MPEG-2's VLC codes with other VLC codes that are valid from the point of view of the MPEG-2 standard, but which will change the flux display. This has multiple visual effects: shaking image, liquefying effect, or rasterization, motion inversion, all of which makes visual perception of the flux unusable or very stressful for the human eye.

Possible modifications for damaging the flux are: replacing the differential motion vectors of a P or B image with differential motion vectors of another P or B image, inverting two differential motion vectors of the same P or B image, inverting two differential motion vectors with two P or B images of the same flux, replacing differential motion vectors of a P or B image with random values, inversing the value of one or more carefully chosen bits of the value of differential motion vectors of a P or B image, replacing the differential motion vectors of a P or B image with the result of a calculation applied to these vectors, where said calculation is an addition, subtraction, multiplication, binary manipulation, or any other mathematical operation, which may or may not be parameterized using a digital key.

The invention comprises applying one of these transformations to the original flux and storing, in a second flux, the information necessary to reconstruct the original flux. This information specifically contains the information drawn from the original flux, and the data indicating how and where to insert them during the reconstruction phase of the original flux, and/or of the information that allows the information from the original flux to be put back in order, for example, when the modification comprises inverting two differential motion vectors for two P or B images of the same flux, and/or information indicating the calculation and any associated digital keys with applying to the modified vectors to retrieve the original vectors. Advantageously, the modifications applied to the original flux are selected as a function of the size desired for the second flux. Advantageously, the analysis decides P and B images to be modified as a function of the desired size for the second flux. Advantageously, the analysis decides P and B images to be modified as a function of the desired level of degradation for the first modified flux.

In a specific implementation of this process, transmission of the first flux is carried out through support equipment that is physically distributed as a CD-ROM, a DVD, a hard disk or a memory card of the flash memory type for example. In another implementation of this process, transmission of the first flux is carried out through a broadband network (cable, satellite, fiber optic, Hertzian, DSL, DAB, UMTS, etc.).

According to the implementation of this procedure, transmission of the second flux is carried out through a cabled network, a switched telephone network (analog or digital RTC), through a mobile telephone network using GSM, GPRS or UMTS standards, through a BLR network (local radio loop) or through a DLS type network. According to another particular variation of this procedure, transmission of the second flux is carried out through a broadband network of the same type as the network used by the first flux, namely through the same network.

According to a particular variant of this procedure, transmission of the second flux is conducted by a memory card of the flash memory type or using a chip card. Advantageously, transmission of one of the two fluxes or of the two fluxes is numbered. According to the implementation of this procedure, the two fluxes generated can be intended for a single piece of equipment, for a group of equipment or to all the pieces of equipment.

According to a particular aspect, reconstruction is conditional upon a transaction. Reconstruction can likewise be authorized for consultation of a private copy requested by the client. In general, the fact that reconstruction is conditional upon authorization of a portal allows any service operator to manage all the rights associated with audiovisual works.

Moreover, the invention concerns a piece of equipment for manufacturing a video flux for the purpose of implementing this procedure comprising at least one multimedia server containing the original video sequences and distinguished by the fact that it comprises a device for analyzing the video flux originating from the server to generate the two fluxes.

Advantageously, this piece of equipment comprises a memory for recording a "private copy" marker indicating, for each sequence, the rights of each user: a private copy that can be looked at an unlimited number of times, a private copy that can be looked at a limited number of times and how many times, a prohibited private copy.

Moreover, the invention involves a piece of equipment for the use of a video flux for the purpose of implementing this procedure comprising a standard flux decoder, at least one recording interface (hard disk, flash-memory type memory) designed to store the contents of the first flux and/or a disk player (CD, DVD, etc.) and at least one display interface (standard screen, wireless screen, video projector) distinguished by the fact that it comprises a means for re-composition of the original flux using the two fluxes.

According to one particular aspect, the means is a software application installed in the equipment. According to another aspect, the means is a fixed electronic device. According to yet another aspect, the means is a portable (mobile) electronic device with a built-in screen.

According to an aspect where the piece of equipment is installed on a computer, the means used is a resource that is specific to the product (card) to avoid copying temporary information from the second flux onto permanent support.

Advantageously, the recording interface also stores a "private copy" marker in relation to the first flux indicating the user rights for this sequence: a private copy that can be looked at an unlimited number of times, a private copy that can be looked at a limited number of times and how many times, a prohibited private copy.

Advantageously, the equipment comprises a chip card reader that allows the user to be identified. Advantageously, the equipment comprises a chip card reader, where the chip card contains the software applications. Advantageously, the equipment comprises a chip card reader, where the chip card contains data from the second flux for a given content.

Finally, the invention involves a system for transmission of a video flux distinguished by the fact that it comprises a piece of video flux production equipment, at least one piece of user equipment for video flux and at least one communication network between the piece of production equipment and the piece(s) of user equipment.

The invention involves a data flux of nominal format, notably, but not exclusively, an MPEG-2 type flux. The audiovisual flux format used must have the following characteristics:

This format must break the data down into a series of images, where each frame can be complete (I image) or predicted (P image), calculated using motion compensation techniques which take the previous I or P image as a reference.

Optionally, at least one B image calculated using motion compensation techniques that take the preceding and subsequent I and/or P images as their references is present in the nominal flux.

The invention concerns a data flux of nominal format, notably but not exclusively an MPEG-2 type flux. The audiovisual flux format used must have the following characteristics:

this format must break down the data into a series of images, where the series comprises at least one P image;

at least one P image contains motion vectors.

In the following description, an example involves an MPEG-2 flux without this fact constituting a limitation of the scope of protection.

The general principle of a securing process for a video flux is revealed hereinafter.

An objective is, for example, to authorize video services upon request and on a pick and pay basis through all these broadcast networks and the local recording in the user's digital decoder box. The solution comprises permanently preserving, outside of the user's habitation, in fact in the broadcast and transmission network, a part of the recorded audiovisual program, where this part is primordial so as to view the audiovisual program on a television screen or monitor-type screen. However, since it is of a very low volume relative to the total volume of the digital audiovisual program recorded by the user, the missing part will be transmitted via a transmission network at the time the pre-recorded digital audiovisual program is viewed by the user.

The greater part of the audiovisual flux will therefore be transmitted through a standard broadcast network whereas the missing part will be sent upon request through a narrow band telecommunication network such as standard RTC-type telephone networks or GSM-, GPRS- or UMTS-type cellular networks or by using a small part of a DSL or BLR-type network, or even by using a sub-assembly of a broad band from a broadband network such as a cable or fiber optic network.

Figure 1:
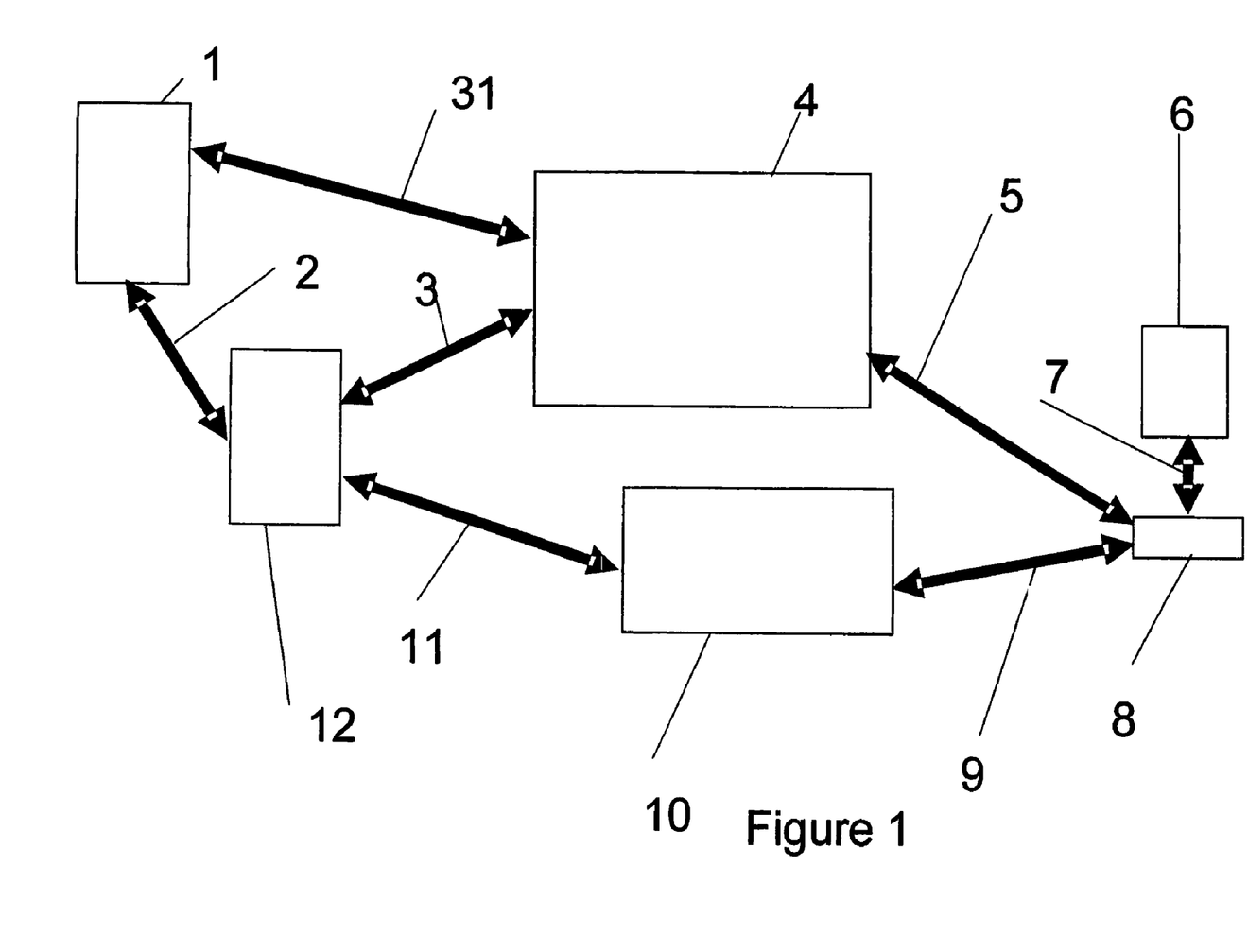
FIG. 1 schematically shows the overall architecture of a system for the implementation of the process according to aspects of the invention.

In FIG. 1, the arrangement of the video interface (8) is adapted to connect at least one display device, for example a monitor, a video projector or a television-screen type device (6), to at least one transmission and broadband broadcast network interface (4) and to at least one telecommunications network interface (10). This arrangement is composed of a module (8) comprising primarily, on the one hand, a processing unit adapted to process, in particular, decoding and unscrambling all video fluxes of the MPEG-2 type according to a pre-loaded decoding and unscrambling software program, so as to display it, in real or deferred time, store it, record and/or send it to a telecommunications network and, on the other hand, at least one screen interface (7) and a connection interface to a local or decompressed network (5) and/or (9). The transmission and broadband broadcast network (4) and the telecommunications network (10) can be combined into a single network.

The module's optional hard disk (8) can be used as a memory buffer to momentarily store at least a part of the program or the video sequence to be displayed, in case of deferred viewing or limitation in the bandwidth of the transmission network. Viewing can be delayed or deferred upon the user's or portal's request (12).

As FIG. 1 shows, the connection interface (5) is connected to a transmission and broadband broadcast network (4) such as a modem, a satellite modem, a cable modem, belonging to a fiber optic line interface or a radio or infrared interface for wireless communication.

It is through this standard video broadcast connection that the audiovisual program contents such as films will be transmitted. Even so, in such a way as to not allow pirated copies to be made, before transmitting the audiovisual contents from the server (1) or portal (12) provisions are made to preserve a small part of the audiovisual contents in the portal (12).

In case an audiovisual program is being viewed in real time, this small part of the audiovisual contents in portal (12) will likewise be sent to module (8) through telecommunications network (10).

MPEG-2 compression begins by breaking down the image into different square matrices comprising multiple points or pixels, each of which has its own colorimetric value. A calculation allows a mean value to be obtained for each matrix within which each point is now embedded. This processing generates a rasterization and the apparition of uniform flats, in places where tint nuances existed. The second stage of MPEG-2 compressions comprises preserving only the elements that change from one image to the next.

The video is shown as a succession of individual images, of which each is processed like a bi-dimensional matrix of image elements (pixels). Representation of the colors in each pixel consists of three components: one luminance component Y and two chrominance components, Cb and Cr.

Compression of the digital video takes place using several techniques: chrominance data sampling to adapt to the sensitivity of the human visual system (HVS), quantification, motion compensation (MC) to use temporal redundancy, transformation in the frequency domain by discrete cosine transformation (DCT) to use spatial redundancy, variable length encoding (VLC) and image interpolation.

Since the human vision system (HVS) is more sensitive to resolution of the luminance component of an image, the Y-pixel values are encoded at full resolution. The human visual system is less sensitive to chrominance information. Sub-sampling eliminates the pixel values based systematically on position, which reduces the quantity of information to be compressed by other techniques. The standard thus preserves a set of chrominance pixels for each 2×2 neighborhood of luminance pixels in the case of the 4:2:0 format.

The basic encoding unit for an image is the macroblock. Macroblocks for each image are encoded successively, from left to right and from top to bottom. Each macroblock comprises several 8×8 blocks: four luminance blocks, one or more chrominance blocks Cb and one or more chrominance blocks Cr. It should be noted that the luminance blocks cover the same area of the image as the chrominance blocks, due to the fact that the sub-sampling of the chrominance, carried out to adapt the encoding for the sensitivity of the human visual system.

For a given macroblock, the first operation is the choice of the encoding mode which depends on the type of image, the effectiveness of the prediction compensated in motion in the encoded region, and the nature of the signal contained in the block. Secondly, a compensated motion prediction is formed for the contents of the block, based on prior or future reference images. This prediction is subtracted for real data from the current macroblock to form an error signal. Thirdly, this error signal is divided into 8×8 blocks (4 luminance blocks and at least 2 chrominance blocks in each macroblock) to each of which is applied a discrete cosine transformation (DCT). The resulting 8×8 block of DCT coefficients is quantified. The two-dimensional block that results from it is zig-zag scanned so that it is converted into a one-dimensional chain of quantified DCT coefficients. Fourthly, the attached macroblock information (type, vectors, etc.) as well as the quantified coefficient data, are encoded. A certain number of encoding tables of variable length are defined for the different data elements to obtain a maximum efficiency. Frame length encoding is applied to the quantified coefficient data.

The DCT coefficient of point (0, 0) in the upper left of the block represents a horizontal and vertical nil frequency: it is called the DC coefficient (continuous). Because coefficient DC is proportional to the mean value of the pixels in block 8×8, the predictive encoding allows an additional compression, because the difference in mean values of the neighboring 8×8 blocks tends to be relatively small. The other coefficients represent one or more non-zero horizontal and/or vertical spatial frequencies and are called AC coefficients. So that the level of quantification of the coefficients corresponding to high special frequencies favors creation of a nil coefficient, a quantification step is chosen such as the human vision system (HVS) will have little chance of perceiving the loss of spatial frequency involved, except if the value of the coefficient is above this quantification level. The statistical encoding of predicted ranges for high-order coefficients of nil value, contributes considerably to the gain in compression. To regroup the non-zero coefficients at the start of the series and to encode as many zero coefficients as possible after the last non-zero coefficient, their sequence is given by a zigzag scan which concentrates the higher spatial frequencies at the end of the series.

Variable length coding (VLC) is a statistical encoding technique that allocates code words to values to be encoded. Short code words are allocated to values with high frequency of occurrence, and long code words to those of low frequency occurrence. On average, the more frequent code words are in the majority, such that the encoded chain is shorter than the original data.

The invention comprises using and modifying differential motion vectors of P and/or B images to manipulate the appearance and visual validity of the sequence to which the images in question belong.

Figure 2:
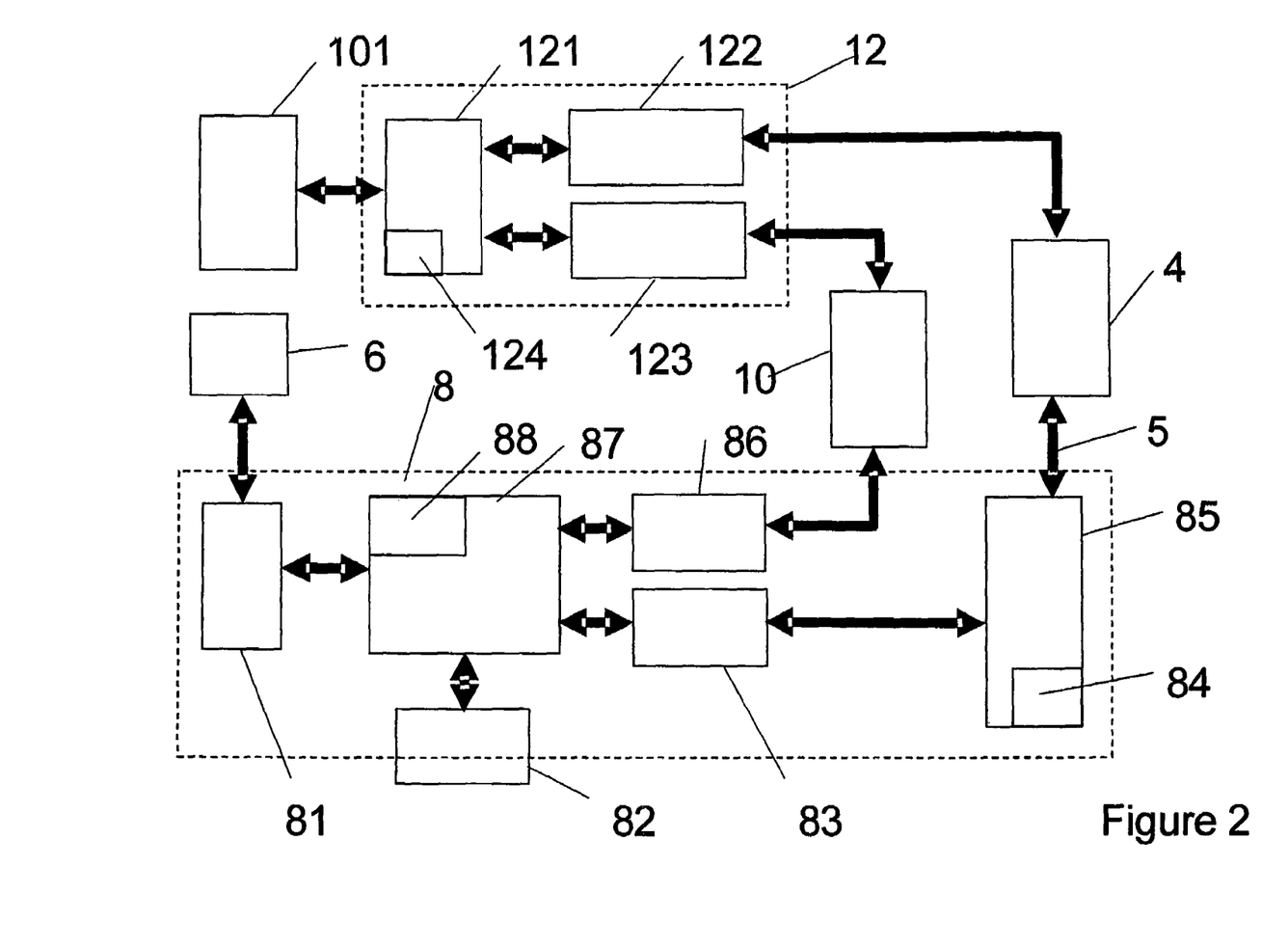
FIG. 2 shows a particular selected aspect of the analysis and flux synthesis systems of the invention.

According to one particular aspect, the complete MPEG-2 flux (101) is analyzed with the analysis device (121) in portal (12); all P images are analyzed for the purpose of finding each of their differential motion vectors. For each value found, the system proceeds with its backup in the buffer (123) of portal (12), and it is replaced in the flux by the maximum value authorized by the standard, identically for each value found. The transformed flux is stored in the output buffer (122), its size is different from the original flux (101), but it is readable by any reader (8) that is capable of reading the original flux (101).

According to one aspect, all P images of the complete MPEG-2 flux (101) are analyzed by the analysis device (121) of the portal (12) for the purpose of finding each of their differential motion vectors. Only the differential motion vectors from one macroblock out of two or three will be transformed to decrease the size of the backup data. The means of finding the images that were modified will be preserved in the buffer (123) in portal (12) with the original values of the transformed differential motion vectors.

According to one particular aspect, all the P images of the complete MPEG-2 flux (101) are analyzed by the analysis device (121) in portal (12) for the purpose of finding each of their differential motion vectors. To have a transformed flux that is of identical size to the original MPEG-2 flux (101) to the level of the output buffer (122), only a certain number of bits in the VLC code representing the processed value will be transformed, such that the resulting VLC code will respect the standard, and the new value will be sufficiently distant from the original that the transformation will be as effective as possible.

According to another aspect, only one part of the original MPEG-2 flux images (101) is analyzed and transformed, thereby allowing the size of the memorized data in the buffer (123) of portal (12) to be increased.

When it reads the binary train, the standard MPEG-2 decoder identifies the start of an encoded image, then the type of image. To avoid any confusion between a standard decoder box, which is often called the "Set Top Box or STB", the standard MPEG-2 decoder is hereinafter referred to as the "Player" or "Viewer". This Player can be hardware or software. The MPEG-2 player successively decodes each macroblock image. The image is reconstructed when all its macroblocks have been processed. If it is an I image, it constitutes a reference image for the subsequent images and is stored in the place of the oldest reference image. The images are thus available, in digital format, for post-processing and display, as the application desires.

In the case of an MPEG-2 type audiovisual program, not all of the characteristics of the P images originating from server (1) or from portal (12) are transmitted towards module (8). In particular, the characteristics in compliance with the invention are the differential motion vectors contained in the P images.

Certain differential motion vectors in these P images are preserved in the portal (12). On the other hand, in the stead and place of the differential motion vectors of these untransmitted P images, the device in compliance with the invention inserts false differential motion vectors of the same nature as the differential motion vectors that were removed and preserved in portal (12) such that the standard MPEG-2 player in module (8) is not disturbed by these modifications which it ignores and reconstitutes upon output of an MPEG-2 output flux which is incorrect from the visual point of view for a human being, but correct from the MPEG-2 format point of view.

The MPEG-2 player of box (8) is a standard MPEG-2 player and is not in any way modified or affected by the changes made to the P images.

As shown in FIG. 1, the interface of connection (9) is connected to a decompressed telecommunications network (10), either directly or through a local network that serves as an access network and consists for example of a subscriber line interface (analog or digital telephone network of the RTC type, DSL, BLR, GSM, GPRS, UMTS, etc).

In this way therefore, the audiovisual programs are broadcast in the standard manner in the multibroadcast mode ("broadcast") through the Hertzian, cable, satellite, digital Hertzian, DSL or the like broadband transmission network (4) from server (1) directly through connection (31) or through the portal (12) through connection (2) and (3) towards the decoder module (8) through connection (5). Each audiovisual program broadcast in this way can be either encrypted or not and, in accordance with aspects of the invention, the MPEG-2 type flux comprises modifications at the level of certain P and/or B images as described above. As a function of the parameters chosen by the user or information transmitted by the broadcast server, certain audiovisual programs this modified and incomplete are recorded on the hard disk box (8).

When the user wishes to view an audiovisual program recorded in this way on the hard disk of box (8), the user requests it in the standard way using a remote control connected to box (8) which is thus automatically connected to the portal (12) through connection (9) of the local network or direct access type and through the telecommunications network (10) which is itself connected to portal (12) through connection (11). All throughout viewing of the audiovisual program, connections (9) and (11) remain established and allow box (8) to receive the functions and parameters for putting the modified differential motion vectors of the P images to be placed in order and/or corrected. The modified differential motion vectors of the P images transmitted in this way are never recorded in the hard disk of box (8) because the reconstructed P images are directly displayed on the viewing screen (6) through connection (7) after being processed by the player in box (8) starting from its volatile local memory. Once processed and viewed, the modified and/or missing differential motion vectors of the P images that were just transferred by portal (12) will be erased from the local volatile memory in box (8).

According to one particular aspect, the flux that has been recomposed by box (8) is not bit for bit identical to the original flux. Box (8) in effect slightly modifies certain motion vectors in such a way that visually, the flux displayed on the viewing screen (6) is identical to the original flux (101), but that certain differences are calculated and introduced at the binary level. The presence of these differences in effect complicates the task of an ill-disposed user who wishes to bypass the video flux protection. This calculation is carried out as a function of the client's characteristics, for example a digital identifier of box (8) or the serial number of box (8). The differences made to the motion vectors are introduced in several ways. For example, they comprise incrementing by one the value of the motion_residual field of certain motion vectors. The positions of the differences are determined by box (8) using a random variable generator initialized with a digital identifier of box (8) or the serial number of box (8). Since this difference is very slight, it barely affects the visual appearance of the recomposed flux on the viewing screen (6), but the recomposed flux is no longer identical bit for bit to the original flux.

Advantageously, the modifications made to the motion vectors which allow a binary difference to be obtained between the original flux (101) and the recomposed flux displayed on the viewing screen (6) that are visually identical to the original flux (101), are parameterized using information that is present in the second flux sent by connection (10). For example, the second flux contains a binary field that indicates to box (8) that the modification to be made to the motion vectors of a given image of the reconstituted flux comprises adding a random variable that can take the values −1, 0 and 1 to the motion_residual fields that it contains.

According to another aspect, the original values of the differential motion vectors of the P images broadcast in this way may or may not be encrypted, by any means of encryption that exists now or that may exist in the future. This is also the case for algorithms, functions and re-ordering parameters for modified differential motion vectors of P images.

Each time the user wishes to look at a program recorded on the hard disk of box (8), box (8) automatically connects to portal (12). Likewise, when the user takes a break, transmission of information for correcting original differential motion vector values of P images originating from portal (12) is interrupted until viewing is resumed, thus guaranteeing that all the information in an audiovisual program will not be in box (8) at a given time and thus preventing an ill-disposed person from making pirated copies of these recordings.

According to one aspect, box (8) comprises a chip card reader which allows portal (12) to authenticate the proprietary user of box (8).

According to another aspect, for a given MPEG-2 content, the chip card contains the second flux which was recorded by portal (12).

If this is authorized, the chip card likewise allows the user to make private copies of audiovisual programs recorded on the hard disk of its decoder box (8). To do this, if the user wishes to make a copy of an audiovisual program, the user makes it in the standard manner on a video cassette recorder through connection (7) which connects box (8) to the viewing screen (6).

According to another aspect, if the user wishes to keep a private copy in the hard disk of box (8), the user indicates this fact to the server which records the "private copy" information for this program in the private copy memory (124) of portal (12) and for this user who has been authenticated by the chip card. Then, each time the user wishes to view this private copy, the box (8) automatically connects to portal (12) and indicates to the latter that the user wishes to read the private copy. In return, if reading the private copy is possible for this user who possesses this chip card and for this program, the decoder box (8) then receives the differential motion vectors that are missing from the P images as well as all the other information allowing viewing of the audiovisual program consisting of the private copy.

According to one aspect, the so-called "private" copy can permit the user unlimited viewing of this same audiovisual program or viewing for a number of times determined in advance by the service provider who authorized this private copy.

The invention likewise involves the physical box (8) used by the consumer to access data. This physical box is located in the user's home. The user provides a set of functionalities which directs the appropriate information to be presented according to the selection of the audience and directs connection and communication with the remote server.

According to one particular aspect, the physical box corresponding to the video interface arrangement (8) is carried out like a fixed autonomous device with integrated hard disk. The physical box corresponding to the video interfacing arrangement (8) may also be carried out like a portable (mobile) autonomous device with integrated hard disk and/or disk player (CD, DVD, etc.). The autonomous physical box (8) may comprise a chip card reader.

According to one aspect, the arrangement of the video interface (8) is carried out like an additional card which will be installed in a PC-type computer and is connected to at least one network transmission and broadband broadcast interface (4) and at least one telecommunications network interface (10). This card uses the hard disk in the PC computer for recording the first flux, but includes its own calculator and its own volatile memory so that it does not allow the ill-disposed PC user the means of accessing additional information such as modified differential motion vectors of the P images of the second flux.

The video and multimedia servers (1) and/or (12) comprise a means of encoding, transcoding and scrambling of video data, in particular means of adding cryptographic and security information at the beginning and all throughout the sequences.

Finally, it should be noted that the invention degrades the MPEG-2 flux from the visual point of view until it does not allow recognition of the scenes transmitted and displayed without having access to the additional data and characteristics, but totally reconstitutes the MPEG-2 flux in the video interface arrangement (8) without any losses.

The invention will be better understood using the following description which presents the physical basis for the invention and in reference to FIG. 2 showing a preferred aspect of the latter as a non-limiting example that is particularly well adapted for cable and satellite networks. The complete MPEG-2 flux (101) is analyzed by the analysis device (121) of portal (12) and is separated from an MPEG-2 type flux bus of which a part, or even all the differential motion vectors of the P images will have been processed and that it will be sent through output (122) of the portal towards the broadband transmission broadcast network (4).

The other part of the modified MPEG-2 flux is recorded in the memory buffer (122) of portal (12). For each MPEG-2 flux broadcast in this way, portal (12) preserves, in a memory buffer (122) the modifications that have been made to this MPEG-2 flux by analyzer (121) of portal (12). It is specified here that, for a same MPEG-2 input flux (101), the flux processing can be different for each user (8) and/or for each group of users (8). In this way, the memory buffer (123) of portal (12) comprises a different memory zone for each user.

In examples carried out, for a first user, the differential motion vectors for certain MPEG-2 flux P images are modified; for a second user, certain differential motion vectors of P images and certain B images of the MPEG-2 flux are modified; in the third example, the device (8) is portable (mobile).

We now describe in detail the different stages for this first user.

Portal (121) has chosen the MPEG-2 flux (101) that it will have to send to user (8) to be looked at in deferral on its television screen (6). This user is connected to a digital broadcast cable network (4) and to an ADSL telecommunications network (10).

The analysis system (121) of portal (12) will therefore read the entering MPEG-2 flux (101) and, each time it detects a P image, it breaks it down into macroblocks, then into blocks. This analysis allows it to recognize the differential motion vectors in the code, and substitute some of them with random values to make the images (and consequently the sequence) unacceptable from the point of view of human visual perception. The true values of the differential motion vectors are stored in the output buffer (123), which later allows reconstitution of the starting sequence in box (8), following the inverse scenario. In the example, one macroblock out of two comprises a modified block (differential motion vectors).

The analysis system (121) thus inscribes the value of the coefficient substituted for the P image modified in buffer (123). The analysis system (121) continues its analysis until the end of the output MPEG-2 flux.

The new MPEG-2 modified flux is then recorded in output buffer (122) so that it can be broadcast on the broadcast network (4) through connection (5). The substituted differential motion vectors of modified P images of entering MPEG-2 flux (101) are recorded in the buffer (123) of portal (12).

During this time, and in an entirely non-synchronized manner, the modified MPEG-2 output flux originating from the output buffer (122) of portal (12) is broadcast through the broadband network (4) towards one or more users (8).

Each authorized decoder box (8) that wishes to record this MPEG-2 flux modified in this way can then read this MPEG-2 flux and record it on its hard disk (85). This recording initiative is left to decoder (8) under the control of portal (12). To do this, the analysis system (121) had inscribed, at the start of the MPEG-2 flux, information about additional data which specified the recipients of this modified MPEG-2 flux. The recipients thus may be a particular recipient (8) and only this recipient, a group of recipients (8) or all the decoders (8) connected to network (4).

The phase described above corresponds to the first preparation phase of the MPEG-2 flux by portal (12), to its transmission via the broadband network (4) and to its recording in a decoder (8). This decoder can then display this MPEG-2 flux recorded in its hard disk (85). To do this, synthesis system (87) of box (8) reads file MPEG-2 from its hard disk (85) and sends it toward a standard MPEG-2 player (81). If no additional data is received by the synthesis system (87), then the MPEG-2 flux coming from player (81) is processed and displayed as it is, which causes a significant distortion in the display on the viewing screen (6). In effect, the modified P images which are handled by the synthesis system (87) do not correspond to the P images which are necessary for correct viewing, because certain differential motion vectors have been substituted by the false differential motion vectors. On the other hand, since the recorded flux is indeed an MPEG-2 type flux, the player (81) makes no difference and displays the information on the output screen (6) which indeed appears like data in an MPEG-2 video flux, but totally incoherent to the human being looking at screen (6). Any copies of the MPEG-2 flux originating from hard disk (85) of box (8) produce the same visual effect once it is reconstructed by any MPEG-2 player. Therefore, utilization of this copy that is ill-disposed is destined to fail.

When the user of decoder (8) can actually view, on screen (6), the audiovisual program recorded on hard disk (85), the user makes a request for it on the synthesis system (87) with its remote control in the same way as with a video cassette recorder or DVD player that has a menu on its television screen. The synthesis system (87) then makes a request to the hard disk (85) and starts analyzing the modified MPEG-2 flux emanating from hard disk (85) through the player buffer (83). The synthesis system (87) thus establishes a link with portal (12) through telecommunications network (10) which is in the example is a DSL connection. Once this connection has been established, and throughout the entire time the film or audiovisual program is being viewed, synthesis system (87) brings out, from the buffer memory (123) of server (12) the substituted differential motion vectors and the data corresponding to the modified P images in the flux recorded on hard disk (85). These differential motion vectors and this position data reach the synthesis system (87) through the input buffer memory (86) and are stored temporarily in the volatile memory (88) of synthesis system (87). Using the modified MPEG-2 flux coming from buffer (83) and from the differential motion vectors and associated data coming from buffer (86) in memory (88), synthesis system (87), in a process that is the inverse of the analysis process described previously, reconstitutes, by replacing the differential motion vectors of the modified P images with real differential motion vectors and sends the new reconstituted MPEG-2 flux towards player (81) so that it is correctly displayed on screen (6). The substituted differential motion vectors and the data associated with these P images are erased from the volatile memory (88) as soon as they are used.

In the example, before portal (12) authorizes sending differential motion vectors of P images and associated data from its buffer (123), portal (12) verifies that the user of box (8) is in fact authorized to do so. To do this, portal (12) reads the information contained on chip card (82) in box (8) and verifies that this user is in fact authorized to look at this audiovisual program. It is not until after this verification that the differential motion vectors and associated data are sent from buffer (123) to box (8) corresponding to this user through network (10).

In the example, the user has, moreover, made a private copy of the audiovisual program. The synthesis system (87) therefore wrote, in a part (84) of hard disk (85) additional data as well as the number of chip card (82) and the "private copy" information as data associated with this audiovisual program. When the next private playing of this audiovisual program takes place, synthesis system (87) analyzes this associated data and thus informs portal (12) that the user of decoder (8) is playing the private copy. If this function is authorized for this user (8) by portal (12), the differential motion vectors and associated data are then sent by portal (12) to buffer (86) as described above. In the opposite case, the differential motion vectors and associated data are not sent and the user of decoder (8) is not able to look at the reconstructed MPEG-2 flux.

One variation of the above process comprises applying a different modification: replacing certain motion vector values with random values. A variation of the embodiment used inverses the sign of the motion vectors. The result of such a change is to inverse the motion direction between two reference images. In this way, on a scene that is scrambled in this way and that has motion in it, the motions are inverted. On a video showing a river that flows downwards between rocks, the viewer sees the water climbing the slope. On a video showing a traveling shot (transverse scanning of the camera), the traveling direction is inverted (instead of going from left to right, it goes from right to left). Numerous artifacts are moreover visible. These movement inversions are nevertheless cancelled in each I image that is transmitted; this is why a video scrambled in this way has motions that are very stilted.

To do this, the primary components of the motion vectors (known as motion_code for the MPEG-2 standard) are encoded by VLC coding. A given binary series, of variable length, encodes for one value. In this way, 010 encodes for 1, and 0010 for 2. These values can be either positive or negative. The sign of a VLC is determined by its lightweight bit. In this way, 011 encodes for −1 and 0011 for −2. Therefore, to invert the sign of the motion vectors present in an MPEG-2 flux, all that needs to be done is to invert the lightweight bit in all the motion vectors. In this way, in the specific case of MPEG-2, the code contains a bit that indicates the vector sign. In this variation, the analysis device (121) reads the original flux and for each motion vector of each block, inverts its sign, i.e. it replaces the sign bit with its alternative (0 by 1 and 1 by 0). The second flux then consists of a single piece of information intended for synthesis device (87), which specifies that the primary component of each motion vector had been inversed. In this case, the size of the second flux is very small. To respect the process that requests that the second flux be provided upon request of the synthesis device, the second flux can consist of a file that specifies, for each motion vector, the transformation that was applied to it by analysis device (121).

In a variation of this aspect, only certain motion vectors modified in this manner and the second flux specifies the modified motion vectors. Due to the differential encoding of the data in an MPEG-2 type flux, the visual result is just as degraded.

In another aspect of this process, the modification made to the motion vectors is the cancellation of these vectors. To do this, analysis device (121) replaces all the motion vector values with the nil value, while respecting the valid VLC codes for the flux format chosen. The first flux generated in this way can be viewed, but the motion in it is very stilted because, between two I-type images, the motion of objects in the scene shown is nil. The second flux generated by analysis device (121) is then constituted from real motion vector values. The size of the second flux is thus greatly dependent upon the number of modified motion vectors.

In yet another aspect of this process, the original differential motion vector is substituted with a random value that is of a different size than the original flux's motion vector (101). The fact that the number of bits on which the motion vector is encoded is changed, causes an increase in the visual degradation associated with the modified flux obtained and stored in output buffer (122).

In still another aspect of this process, the original differential motion vector is substituted with a random value that is of a different size than the original flux's motion vector (101), but the binary flow of the modified flux stored in output buffer (122) is identical to that of the original flux (101). To do this, when the process begins to process the contents of an image, it substitutes motion vectors with decoys that have a smaller binary size, while at the same time permanently preserving, in the memory of analysis device (121), the relative size difference between the input flux (101) and output flux (122). In this way, for example, after substituting two vectors whose motion_code fields are respectively encoded over 5 bits and 8 bits by vectors respectively encoded over 3 and 1 bits, the size difference between the output and input fluxes is negative by 9 bits. When this difference passes below a certain threshold, such as −10 for example, analysis device (121) inserts decoys of a smaller size than that of the original coefficients. Inversely, when this difference passes below a certain threshold such as −2 for example, analysis device (121) goes back to decreasing the size of the coefficients inserted in the modified flux stored in output buffer (122). By acting in this way on the entire image, the difference calculated at the end of the present image processing is close to zero and negative if the thresholds used are negative. In this way by completing the end of the image with jamming (bits of nil value) the modified image is of exactly the same size as the original image. Likewise, by acting in this way on all the images of the input flux (101), the modified output flux (122) preserves the same binary flow as the original flux (101) whereas even the modified coefficients are of a different size from the original ones.

In another aspect of this process, the motion vector inserted into the modified flux in the output buffer (122) is obtained with the aid of a calculation performed on the original vector. This calculation is for example an incrementation by 1 applied to the motion_code of the vector, by using a module based cyclic calculation so that the value of motion_code remains within the (−16; 16) range as indicated in the standard. Addition takes place before VLC (Variable length coding) of motion_code such that the vector generated is in compliance with the MPEG-2 standard. The second flux stored in the output buffer (123) contains information that allows the client workstation (8) to carry out the inverse operation of recovering the original vectors by subtracting 1 from the modified motion_codes.

The motion vector inserted into the modified flux may be obtained using a calculation performed on the original vector and parameterized by a digital key. For example, the operation comprises adding a digital key to each motion_code of each vector, where the digital key and an inverse operation identifier allow reconstruction of the original vectors, it being specified within the second flux stored in buffer (123). The operation may also be carried out on each motion_residual vector of each field.

The modifications made to the motion vectors may be of two types. Certain motion vectors are replaced by random vectors, and at least one of the other motion vectors inserted into the modified output flux (122) is obtained using a calculation performed on the original vector and is parameterized by a digital key, where the key is equal to the original value of the motion_code of the last vector modified by substitution with a random value. The second flux stored in buffer (123)

thus contains the original values of the vectors substituted with random values as well as an indicator of the operation to be applied to the modified vectors to obtain the original vector. For example, the operation carried out on the vectors not substituted for by random values comprises adding the motion_code value of the last vector substituted with a random value, to the motion_code of the vector to be modified.

The operation carried out on the vectors not substituted for by random values may comprise adding a value obtained at the output of a generator of pseudo-random variables initialized with the value of the last motion vector substituted for with a random variable.

In another example, the operation carried out on the vectors not substituted with random values comprises adding a value obtained at the output of a generator of pseudo-random variables initialized with the result of the addition of the value of the last motion vector substituted by a random value with the number of operations of the same type already carried out in the current image or since the start of the analysis of the input flux (101).

In all these examples, the addition used on the motion codes of the vectors to be modified is carried out before the VLC encoding of the said motion_codes to remain in compliance with the MPEG-2 standard, and is cyclical so that the output value obtained remains in the [−16; 16] range of motion_codes variation. The exact mathematical operation used is an addition modulo 32 followed by a subtraction of 16.

We shall now derive in detail different stages for the second user (8).

In the second case, the broadcast network (4) is a satellite network and the telecommunications network (10) is a low broadband cellular phone system of type GSM or GPRS.

In a manner identical to the above description, the user of decoder (8) receives the MPEG-2 flux and the additional data from portal (12).

On the other hand, in this example, instead of modifying each P image, analysis system (121) takes only one P image out of n where n is a random number between 1 and 12 and takes the B images into consideration. In this way, before sending the MPEG-2 flux from output buffer (122), analysis system (121) reads the MPEG-2 input flux (101) and after drawing a random number n, the synthesis system modifies the differential motion vectors at the nth P image of the MPEG-2 flux. After each P image modified in this way, analysis system (121) makes a new drawing of a random number n. Each random number utilized in this way is recorded in buffer (123) of portal (12). For the B images, analysis system (121) takes into consideration one B image out of m where m is a random number between 1 and 5, in a frame for which the P image was not modified.

Analysis system (121) of portal (12) reads the entering MPEG-2 flux (101) and, each time that it detects an nth P image or an mth B image, breaks it down into macroblocks, then into blocks. This analysis allows it to recognize the differential motion vectors in the code, and substitute some of them with random values to make the images (and consequently the sequence) unacceptable from the human visual perception point of view. The true values of the differential motion vectors are stored in output buffer (123), which later allow restoration of the start sequence in box (8), by following the inverse scenario.

Moreover, in the second example, not all of the differential motion vectors in this nth P image are modified. Only one macroblock out of two comprises a modified block (differential motion vectors), while at the same time respecting the equality of frequencies of modification for the blocks in a macroblock. Moreover, substitution of each differential motion vector takes place by a differential motion vector calculated in a random manner, but its value is compared to the value of the differential motion vector to be substituted to verify its gap. If this gap is too small, another random number is calculated to increase the gap between the vector to be substituted and the substitution vector.

This is also the case for the B images.

Decoder (8) reads buffers (86) and (87) and decodes the binary train data elements, in compliance with the defined syntax to reconstruct the MPEG-2 flux. When it reads the binary train, the decoder identifies the start of an encoded image, then the type of image. It successively decodes each image macroblock. The type of macroblock and the motion vectors are used to construct a prediction of the current macroblock, founded on prior and future reference images that have been stored in the decoder. The differential motion vector data are decoded. The result is added to the prediction signal, with a defined dynamic. Before sending the MPEG-2 flux to reader (81), the synthesis system (87) replaces the differential motion vectors with P and B images that have been substituted with those of the flux originating from buffer (86).

When the MPEG-2 flux is reconstructed by the synthesis system (87) of decoder (8), the reader of these random numbers and the differential motion vectors substituted from the output buffer (123) of portal (12) and reading of the MPEG-2 flux modified in this way from hard disk (85) of box (8) allowing the synthesis system (87) to reconstruct the P and B images and send everything to reader (81).

The image is reconstructed by reader (81) when all these macroblocks have been processed. In the example, it was determined that the second flux required a bandwidth that was less than one per thousand of the bandwidth necessary to transmit the high-quality MPEG-2 flux, or less than four kilobits per second for the second flux relative to the four megabits per second for the first MPEG-2 flux.

Figure 3:
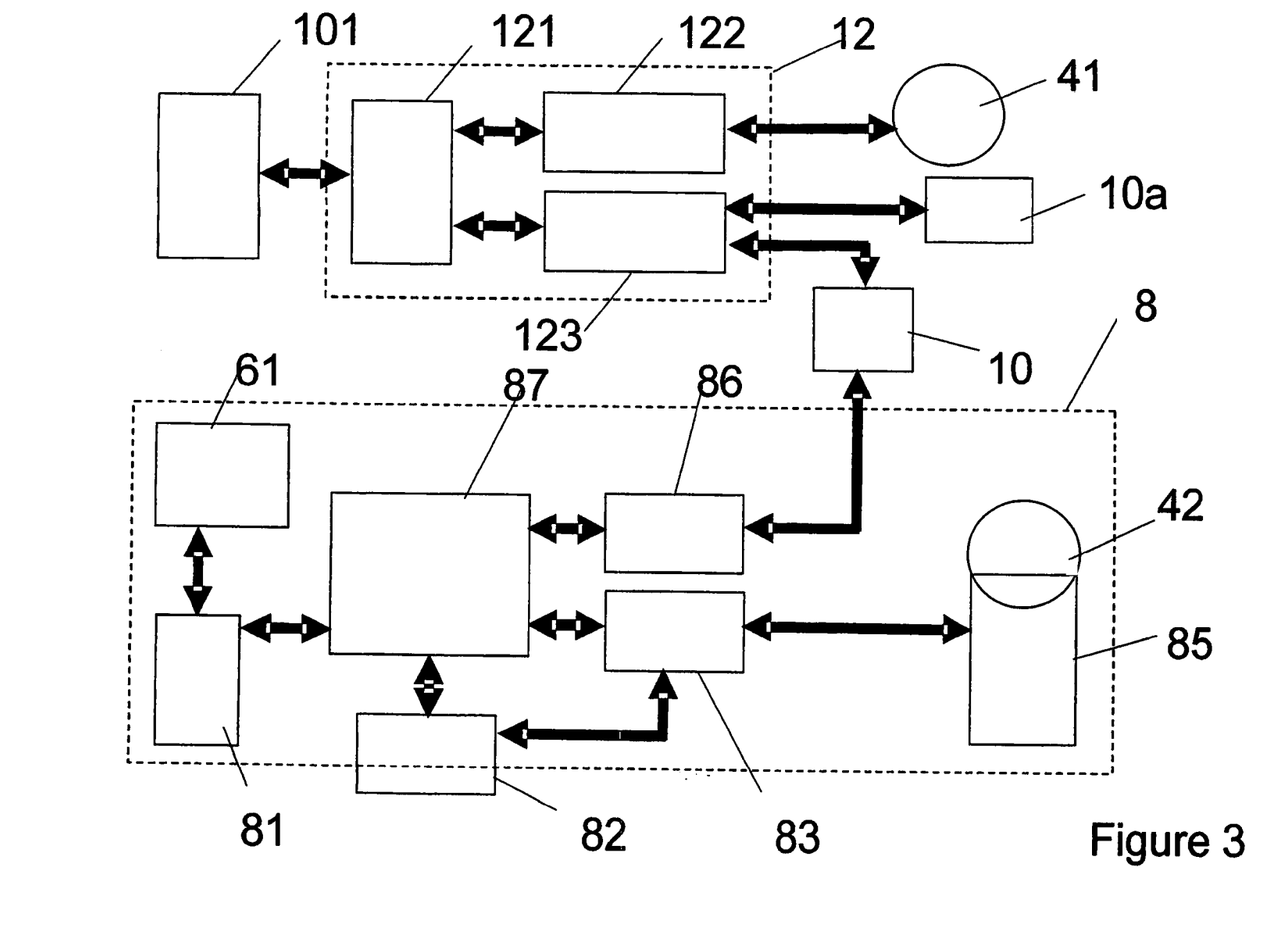
FIG. 3 shows a particular selected aspect of the flux synthesis system of the invention.

We shall now describe in detail the different stages for this third user in FIG. 3.

In that aspect, the MPEG-2 flux is processed by analysis system (12) in the same way as the MPEG-2 flux of the second aspect.

Even so, the first modified MPEG-2 flux is inscribed and recorded on a physical support (41) of the CD type using the output memory buffer of analysis system (12).

The second flux is recorded in buffer (123) and likewise recorded again on a physical support (10a) in credit card format consisting of a chip card and a flash memory. This card (10a) is read by the card reader (82) in device (8). Device (8) is an autonomous, portable and mobile system. Device (8) comprises synthesis system (87), standard MPEG-2 reader (81), the two memory buffers (86) and (83) as well as the disk reader (85).

Moreover, device (8) comprises an integrated screen (61) of the flat screen type which allows the user to directly view audiovisual programs on the autonomous device (8).

The user of device (8) introduces a disk (42) of type (41) identical to that recorded by analysis system (12) into disk reader (85) to view an MPEG-2 type audiovisual program. This disk (42) thus contains an MPEG-2 flux of the first flux type, i.e. with differential motion vectors of certain substituted P and/or B images.

The user of device (8) can therefore view this MPEG-2 flux on the screen (61) integrated into device (8). Nevertheless, because of the substitution of differential motion vectors, the MPEG-2 flux will not be correct from the visual point of view. The user introduces a chip card (82) into the reader, where the memory card (10a) contains the second flux with the differential motion vectors to render the flux visually correct. The synthesis system then reconstructs the correct MPEG-2 flux using the primary flux originating from disk (42) and the second flux originating from card (10a) connected to player (82).

In one particular arrangement, the chip card (10a) likewise contains the applications and algorithms that will be executed by synthesis system (87). In another particular arrangement, the chip card (10a) contains the data and the differential motion vectors from several second fluxes for the restoration of several MPEG-2 fluxes. In one particular arrangement, device (8) comprises a cellular connection with a GMS or GPRS network (10).

Although this invention has been described in connection with specific forms thereof, it will be appreciated that a wide variety of equivalents may be substituted for the specified elements described herein without departing from the spirit and scope of this invention as described in the appended claims.

The invention claimed is:

1. A process for distributing video sequences according to a nominal flux format comprising a succession of images, where each image comprises a succession of blocks, among which at least one of the blocks in one of the images is calculated by motion prediction relative to at least one reference image, where the motion prediction is encoded in a nominal flux with a plurality of motion vectors, the process comprising:

the nominal flux is processed, before transmission to client equipment, with an analysis by generating a first modified flux having the same format as the nominal flux and having images modified by substitution of selected data with randomly selected values from valid values which do not violate constraints imposed on the selected data by the nominal flux format, wherein the substitution comprises substituting at least one of the motion vectors, and a second flux of any format comprising the substituted data and other digital helper information to reconstruct the first modified flux, the first modified flux and the second flux are then transmitted separately, in real or deferred time, from a server toward the client equipment, and determining a synthesis of the nominal flux, which is calculated on the client equipment as a function of the first modified and second fluxes.

2. The process according to claim 1, wherein the nominal flux format is defined by the MPEG-2 standard.

3. The process according to claim 1, wherein the motion vectors are modified by substituting selected motion vector values with randomly selected values from valid values which do not violate constraints imposed on the selected motion vector values by the nominal flux format, and the second flux comprises the substituted motion vector values and other digital helper information to reconstruct modified images.

4. The process according to claim 1, wherein the nominal flux calculated on the client equipment is visually identical to an original flux and different from the original flux from a binary point of view, the difference being a result of a calculation carried out on the client equipment, where the calculation is parameterized either by client's distinguishing data, or by information transmitted within the second flux.

5. The process according to claim 1, wherein the analysis determines values of motion vectors to be modified as a function of the size desired for the second flux.

6. The process according to claim 1, wherein the analysis determines values of the motion vectors to he modified as a function of degradation desired for the modified first flux.

7. The process according to claim 1, wherein the modification is a substitution by a random value of a size that is different from the size of an original vector.

8. The process according to claim 1, wherein modifications of the size of the motion vectors are carried out in such a way that a binary size or each image of the first modified flux is identical to that of the image of an original flux from which it was calculated.

9. The process according to claim 1, wherein selected modified vectors are a result of a calculation performed on corresponding original vectors, where an identifier of the calculation is specified in the second flux.

10. The process according to claim 9, wherein the calculation is parameterized using a numerical key, where the numerical key is specified in the second flux.

11. The process according to claim 10, further comprising substitutions for motion vectors with random vectors and substitutions of motion vectors with vectors resulting from a calculation performed on original vectors, wherein a digital key used as a parameter by the calculation is an original value of a last motion vector substituted with a random vector.

12. The process according to claim 1, wherein transmission of the first modified flux is conducted through a broadband network or DAB (Digital Audio Broadcasting).

13. The process according to claim 1, wherein transmission of the second flux is carried out through a switched telephone network, a DSL (Digital Subscriber Line) network, a BLR (local radio loop) network or a mobile telephone network using GSM, GPRS or UMTS standards.

14. The process according to claim 1, wherein transmission of the second flux is carried out through physically distributed support equipment.

15. A system that transmits a video flux comprising:

at least one device for re-composition and viewing of a video stream;

at least one telecommunication network between an apparatus and the device for re-composition and viewing of a video stream; and the apparatus that distributes video sequences according to a nominal flux format comprising a succession of images, where each image comprises a succession of blocks, among which at least one of the blocks in one of the images is calculated by motion prediction relative to at least one reference image, where the motion prediction is encoded in a nominal flux with a plurality of motion vectors, the apparatus performing the following steps:

the nominal flux is processed, before transmission to client equipment, with an analysis by generating a first modified flux having the same format as the nominal flux and having images modified by substitution of selected data with randomly selected values from valid values which do not violate constraints imposed on the selected data by the nominal flux format, wherein the substitution comprises substituting at least one of the motion vectors, and a second flux of any format comprising the substituted data and other digital helper information to reconstruct the first modified flux, the first modified and second fluxes are then transmitted separately via the at least one telecommunication network, in real or deferred time, from a server toward the client equipment, and determining a synthesis of the nominal flux, which is calculated on the client equipment as a function of the first modified and second fluxes.

* * * * *